United States Patent
Hackstein et al.

[11] 3,891,502
[45] June 24, 1975

[54] PRESSED BLOCK FUEL ELEMENTS FOR GAS COOLED HIGH TEMPERATURE POWER REACTORS AND PROCESSES FOR THEIR PRODUCTION

[75] Inventors: Karl-Gerhard Hackstein, Hanau; Milan Hrovat, Rodenbach, both of Germany

[73] Assignee: Nukem G.m.b.H., Germany

[22] Filed: Aug. 1, 1972

[21] Appl. No.: 277,050

[30] Foreign Application Priority Data
Feb. 14, 1972 Germany............................ 2206843

[52] U.S. Cl. ..................... 176/71; 176/68; 176/84
[51] Int. Cl. .......................... G21c 3/04; G21c 3/22
[58] Field of Search ............. 176/84, 68, 71, 78, 40, 176/17, 18

[56] References Cited
UNITED STATES PATENTS

| 3,042,598 | 7/1962 | Crowther | 176/68 X |
|---|---|---|---|
| 3,267,001 | 8/1966 | Greebler | 176/17 |
| 3,318,779 | 5/1967 | Turner et al. | 176/71 |
| 3,335,060 | 8/1967 | Diener | 176/17 |
| 3,351,532 | 11/1967 | Raab, Jr. et al. | 176/17 |
| 3,407,116 | 10/1968 | Clough | 176/68 |
| 3,476,645 | 11/1969 | Turner | 176/17 X |

FOREIGN PATENTS OR APPLICATIONS
1,463,313   12/1966   France ................................ 176/84

OTHER PUBLICATIONS
T883001, 2-1971, Pettinger.

*Primary Examiner*—Carl D. Quarforth
*Assistant Examiner*—Roger S. Gaither
*Attorney, Agent, or Firm*—Cushman, Darby & Cushman

[57] ABSTRACT

Block fuel elements for high temperature power reactors that can be reprocessed simply are prepared in which the feed and breed zones are connected with the graphite matrix directly and without transition. They are disposed separately from each other in such a manner that the feed zones and the breed zones can be separately removed one after the other from the structural graphite. In the reprocessing operation there are recovered uranium 233 from the breed particles, uranium 235 and fission products from the feed particles.

6 Claims, 4 Drawing Figures

PRESSED BLOCK FUEL ELEMENTS FOR GAS COOLED HIGH TEMPERATURE POWER REACTORS AND PROCESSES FOR THEIR PRODUCTION

For high temperature power reactors a uranium-thorium fuel cycle is used with the object of recovering the uranium 233 bred from the thorium as well as the thorium which was not exhausted to gain it in the reprocessing plant and to use it again as a fuel after refabrication. At the same time the recovered uranium 233 replaces a part of the otherwise necessary uranium 235. The atom ratio of uranium to thorium lies between 1:5 to 1:20 in the reactor core in the case of known fuel element types. The arrangement in the fuel element is selected in such a way that the coated fuel particles are available from pure uranium 235 or uranium 233 as well as the coated particles from thorium which contain only a few percent by weight of uranium. Since the valuable uranium 233 is recovered practically only from particles containing thorium, one must have already strived during the head-end process for reprocessing to separate the coated particles containing uranium from those containing thorium, in order to obtain an uranium 233 as pure as possible, i.e., an uranium free of other uranium isotopes.

This object can be achieved only in an unsatisfactory manner in the known block fuel element concepts. Since the coated particles containing uranium and thorium in the case of the concepts which have been known hitherto, are used as a mixture, a simple separation is not possible particularly because they are connected together in the fuel particles by the graphite matrix. Suggestions of producing the coating particles containing uranium and thorium in variable sizes, in order to be able to separate them mechanically, have not led to any satisfactory result either, because such block fuel elements must be mechanically comminuted.

In the certainly necessary mechanical comminution of the blocks, and in the burning of the graphite in the head-end step, a high percentage of the particles is destroyed so that even in the case of a variable size of the particles no satisfactory separation of the uranium containing particles from the thorium containing particles is possible.

The mechanical comminution of the block fuel elements and the subsequent separation of the graphite from the coated particles therefore make the reprocessing considerably more difficult.

The present invention by-passes the above mentioned difficulties.

In German Offenlegungsschrift No. 1,902,994, Sept. 24, 1970, corresponding to Hrovat U.S. Application Ser. No. 3,284, filed Jan. 16, 1970 now abandoned, "Block Fuel Element For Gas Cooled High Temperature Power Reactor" and Hrovat U.S. Application Ser. No. 218,244, filed Jan. 17, 1972 (corresponding to German application No. P 2104431.5) entitled "Process For The Production Of Block Fuel Elements For Gas Cooled High Temperature Power Reactor," there is described a monolithic block fuel element with pressed in cooling channels. The entire disclosures of said German applications, said U.S. application Ser. No. 3,284 and said U.S. application Ser. No. 218,244 are hereby incorporated by reference.

As described in those applications the block fuel element is a compact prism consisting only of a homogeneous graphite matrix. The coated particles are embedded in the graphite matrix and constitute the fuel zones whereby the fuel material in the coated particles either can be a homogeneous mixture of uranium oxide and thorium oxide (or carbide), same in each particle, or otherwise each fuel zone contains a mixture of uranium particles as feed material and thorium particles as breed materials. At the same time it is essential that these zones be connected with the remaining graphite matrix without transition and that they produce the actual fuel element structure. The fuel zones themselves are the integrated components of the block element and they contribute substantially to the strength of the fuel element. From this the possibility results of making the fuel zones substantially larger and designing them with more flexibility. The high mechanical integrity of the pressed block element achieved thereby permits attachment of the uranium containing coated particles separate from the thorium containing particles in the form of fuel columns located side by side in a so-called heterogeneous arrangement (according to FIGS. 1 – 3). In the previously known fuel element types made of prefabricated and drilled electrographite blocks, such an arrangement ist not possible, since such a block has been too greatly weakened in its strength as a result of the large number of bores.

Therefore the object of the invention is the arrangement of feed and breed zones in a block of a fuel element, in which these zones contribute to the mechanical strength of said block, arranging said zones in such a way that they can be selectively drilled out of this block. Thereby the thorium containing breed particles and the uranium containing feed particles can be taken separately from the structural graphite. As a result, the burning of the graphite, which raises a difficult exhaust gas problem, is essentially avoided. Therefore, the thorium containing particles can be supplied free of feed particles for the recovery of uranium 233. The feed zones and breed zones can be separated independently from the structural graphite prior to the reprocessing operation. In the reprocessing, uranium 233 is produced from the breed particles and uranium 235 and fission products are produced from the feed particles. The feed and breed arrangement can be selected differently, dependent upon the powder density of the core and the useful life of the fuel element, as well as on the conversion rate striven for.

The invention will be understood best in connection with the drawings wherein

Referring more specifically to the drawings in which like numbers refer to like parts.

Figure 1:
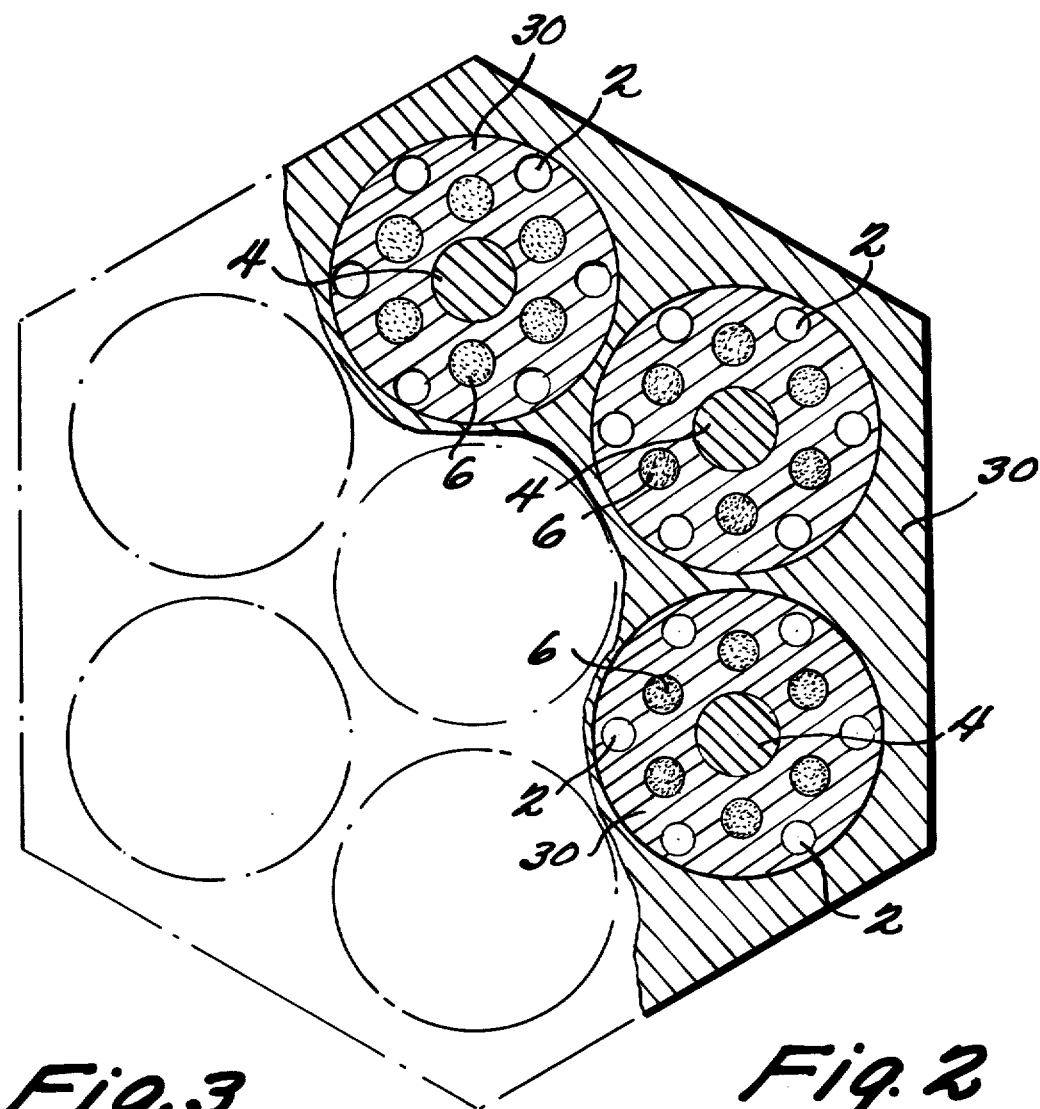
FIG. 1 is a cross section of one embodiment of the invention.

In FIG. 1 uranium containing feed zones 6 of smaller diameter are located in a hexagonal arrangement in a graphite matrix 30 around a central thorium containing breed zone 4. Cooling channels 2 are disposed in hexagonal arrangement around the uranium containing zones.

Figure 2:
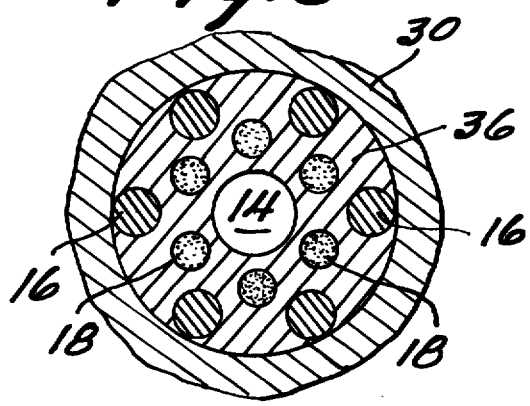
FIG. 2 illustrates a second embodiment of the invention.

FIG. 2 shows a narrow graphite zone 32 around a central thorium containing breed zone 10 and an uranium containing feed zone enclosing said graphite zone, around which feed zone the outside cooling channels 8 are disposed hexagonally in the graphite matrix 34.

Figure 3:
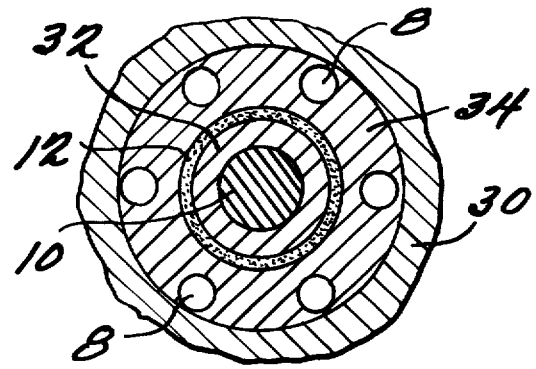
FIG. 3 illustrates a third embodiment of the invention.

FIG. 3 shows a hexagonal arrangement of uranium containing feed zones 18 around a central cooling channel 14, around which feed zones there are hexagonally disposed thorium containing breed zones 16 in the graphite matrix 36.

In the case of all three embodiments, enough graphite structural matrial is disposed between the individual zones, so that these zones can be drilled separately from one another. Thus these zones are directly connected with the surrounding fuel free graphite matrix. In order to explain the invention more clearly, the following example is described.

From a graphite mixture molding powder consisting of natural graphite, graphitized petroleum coke and a binder resin, a pressable and isotropic graphite granulate was produced by cold precompaction and subsequent comminution.

In the specific example there was used a mixture of 60 weight % natural graphite, 20 weight % graphitized petroleum coke and 20% of a phenol formaldehyde resin having a softening point of about 100 °C. and molecular weight 700. This composition is described in more detail in example 1 of the aforementioned Hrovat application Ser. No. 218,244.

The molding powder for preparation of the granulate can be made from a mixture of natural graphite and binder resin, synthetic graphite and binder resin or a mixture of both types of graphite with binder resin. When both types of graphite are employed they can be used in any proportions, e.g., 1 to 99% of either by weight.

In place of the phenol-formaldehyde resin employed in the specific example there can be used phenol formaldehyde resins with other softening temperatures, e.g., 60° to 120°C. as well as xylenol-formaldehyde, cresol-formaldehyde and furfuryl alcohol resins.

The binder resin is normally used in an amount of 10 to 30% of the total of resin and graphite by weight.

Figure 4:
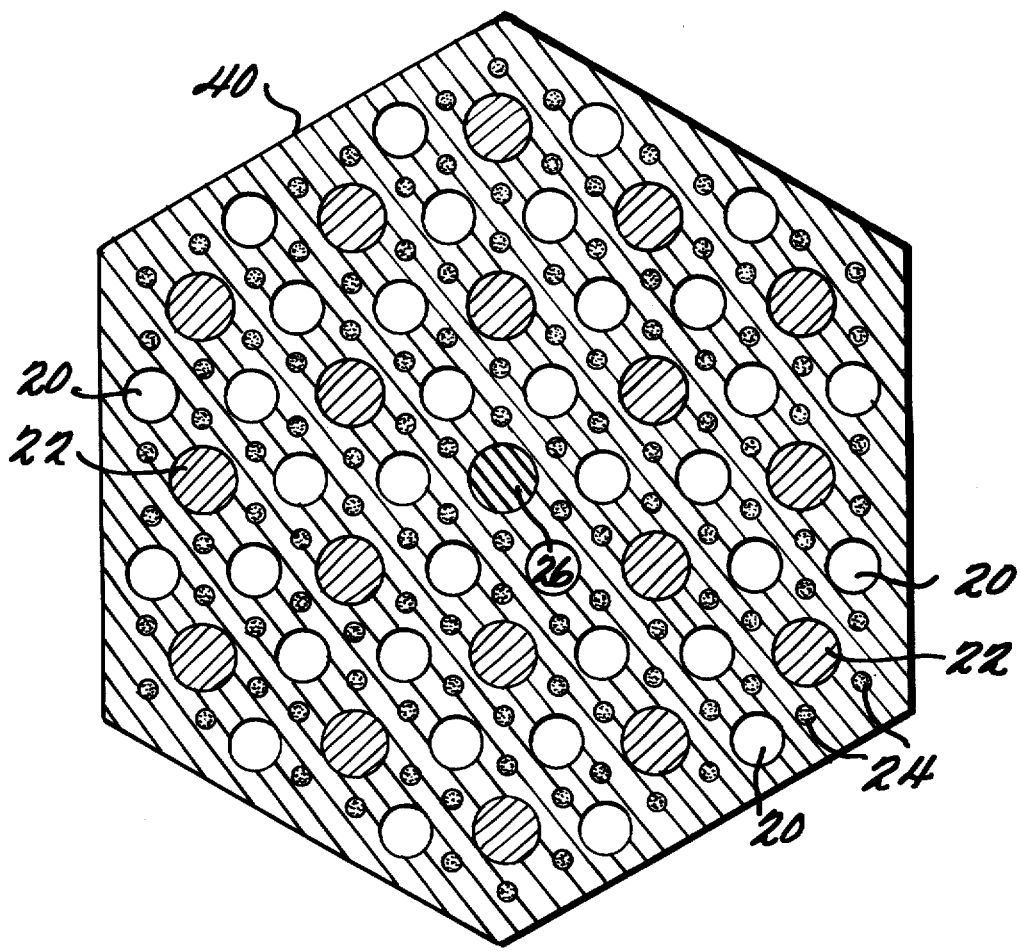
FIG. 4 illustrates a prismatic block containing pressed in channels according to the invention.

From the granulate, a prismatic block 40 with pressed in channels as shown in FIG. 4 was prepressed hot at a temperature of less than 100°C. at 50 kg/cm². Prefabricated cylinders consisting of graphite matrix and coated fuel particles were inserted in the channels provided for reception of the feed particles or the breed particles. Subsequently, metal bars necessary for the maintenance of the cooling channels were inserted. As can be seen from FIGS. 1 and 4 the recurring arrangements of feed zones, breed zones and cooling channels are in repetitive sequence.

After that, the element was final pressed at 90 kg/cm² to its final dimensions at an elevated temperature, specifically 150 °C. After removal of the metal bars, the element was subjected to a final heat treatment at 1,800°C. This final treatment can be at a temperature range of 1,500° to 2,100°C.

The pressures and temperatures employed in preparing the fuel elements of the present invention are not critical and can be any of those conventionally employed in the art.

The coated fuel particles employed were uranium 235 oxide nuclei coated with pyrolytic carbon. The breed particles were thorium oxide.

There can be used other fuel particles with other breeder (or fertile) materials such as those mentioned in Hrovat application Ser. No. 218,244.

What is claimed is:

1. A block fuel element for high temperature power reactors, said element being simple to reprocess and consisting essentially of (1) a fuel free zone consisting of a graphite matrix material, (2) cooling channels, (3) feed zones containing fissile uranium particles embedded in the same type of graphite matrix material, and (4) breed zones containing thorium particles embedded in the same type of graphite matrix material, whereby said cooling channels, said feed zones and said breed zones are all embedded within and surrounded by said fuel free graphite matrix material and together form the block fuel element, said feed zones and breed zones being disposed separately from one another in noncontiguous manner so that the feed zones and the breed zones can be separated independently from the surrounding graphite prior to reprocessing, whereby in the reprocessing operation uranium 233 bred from the thorium is provided from the breed particles and uranium 235 and fission products are produced from the feed particles, there being a plurality of arrangements of feed zones, breed zones and cooling channels in repetitive sequence within the block fuel element, each of these arrangements consisting of a plurality of feed zones, said feed zones contain uranium and are disposed around and separate from a central thorium containing breed zone, and a plurality of cooling channels are disposed outside and around said feed zones.

2. A block fuel element according to claim 1 wherein said feed zones and said cooling channels are arranged hexagonally.

3. A block fuel element for high temperature power reactors, said element being simple to reprocess and consisting essentially of (1) a fuel free zone consisting of a graphite matrix material, (2) cooling channels, (3) feed zones containing fissile uranium particles embedded in the same type of graphite matrix material, and (4) breed zones containing thorium particles embedded in the same type of graphite matrix material, whereby said cooling channels, said feed zones and said breed zones are all embedded within and surrounded by said fuel free graphite matrix material and together form the block fuel element, said feed zones and breed zones being disposed separately from one another in noncontiguous manner so that the feed zones and the breed zones can be separated independently from the surrounding graphite prior to reprocessing, whereby in the reprocessing operation uranium 233 bred from the thorium is provided from the breed particles and uranium 235 and fission products are produced from the feed particles, there being a plurality of arrangements of feed zones, breed zones and cooling channels in repetitive sequence with the block fuel element, each of these arrangements consisting of an annular uranium containing feed zone located around a central thorium containing breed zone and separated therefrom by a narrow graphite zone, said feed zone encasing said graphite zone and disposed around and outside said feed zone a plurality of cooling channels.

4. A block fuel element according to claim 3 wherein said cooling channels are arranged hexagonally.

5. A block fuel element for high temperature power reactors, said element being simple to reprocess and consisting essentially of (1) a fuel free zone consisting of a graphite matrix material, (2) cooling channels, (3) feed zones containing fissile uranium particles embedded in the same type of graphite matrix material, and (4) breed zones containing thorium particles embedded in the same type of graphite matrix material, whereby said cooling channels, said feed zones and said breed zones are all embedded within and surrounded by said fuel free graphite matrix material and together form the block fuel element, said feed zones and breed zones being disposed separately from one another in noncontiguous manner so that the feed zones and the breed zones can be separated independently from the surrounding graphite prior to reprocessing, whereby in the reprocessing operation uranium 233 bred from the thorium is provided from the breed particles and uranium 235 and fission products are produced from the feed particles, there being a plurality of arrangements of feed zones, breed zones and cooling channels in repetitive sequence within the block fuel element, each of these arrangements consisting of a central cooling channel, a plurality of uranium containing feed zones located around said cooling channel and a plurality of thorium containing breed zones disposed around and outside said feed zones and separated therefrom.

6. A block fuel element according to claim 5 wherein said feed zones and said breed zones are arranged hexagonally.

* * * * *